J. G. PETERSON,
ELECTRICAL ATTACHMENT PLUG.
APPLICATION FILED JUNE 4, 1920.
Reissued Feb. 15, 1921. 15,043.
Fig. 5.
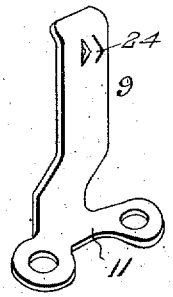
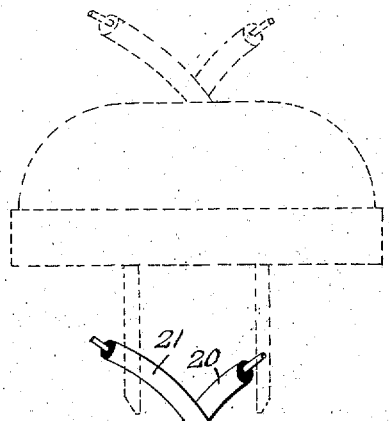
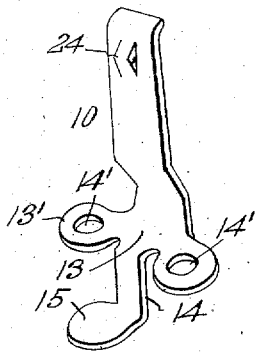
Fig. 6.
Fig. 1.
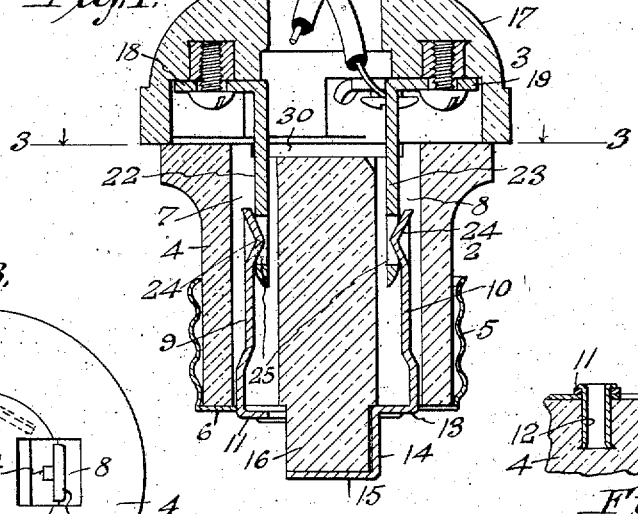
Fig. 3.
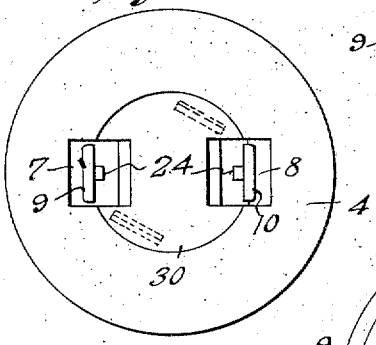
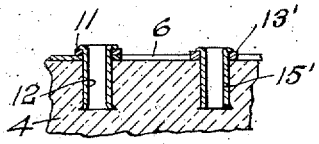
Fig. 4.
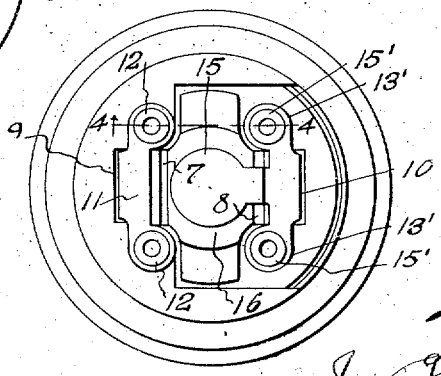
Fig. 2.
Inventor:
J. G. Peterson
By Hoch Fitchen,
Att.

UNITED STATES PATENT OFFICE.

JOHANN G. PETERSON, OF HARTFORD, CONNECTICUT.

ELECTRICAL ATTACHMENT-PLUG.

15,043. Specification of Reissued Letters Patent. Reissued Feb. 15, 1921.

Original No. 1,279,426, dated September 17, 1918, Serial No. 203,617, filed November 23, 1917. Application for reissue filed June 4, 1920. Serial No. 398,841.

*To all whom it may concern:*

Be it known that I, JOHANN G. PETERSON, a citizen of the United States, residing at Hartford, in the county of Hartford and State of Connecticut, have invented certain new and useful Improvements in Electrical Attachment-Plugs, of which the following is a specification.

This invention relates to electrical attachment plugs. I have several motives in view, among them being the provision of an article of this character which is exceedingly simple in construction, quite compact and susceptible of inexpensive manufacture.

In the drawings accompanying and forming part of the present specification I have shown in detail a form of embodiment of the invention which I will set forth fully in the following description to enable those skilled in the art to practise the same. I do not necessarily limit myself to this particular disclosure; I may depart therefrom in several respects within the scope of the invention defined by the claims following said description.

Referring to said drawings:

Figure 1 is a vertical sectional view of the plug with the parts thereof assembled in full lines, the dotted lines showing the cap as disconnected from the body.

Fig. 2 is a bottom plan view of the plug.

Fig. 3 is a horizontal section on the line 3—3 of Fig. 1, looking in the direction of the arrows.

Fig. 4 is a section on the line 4—4 of Fig. 2, looking in the direction of the arrow.

Figs. 5 and 6 are detail views in perspective of terminals.

Like characters refer to like parts throughout the several views, which are on different scales.

The attachment plug comprises a base member and a cap member such for illustration as those denoted in a general way by 2 and 3 respectively. These two parts are after the usual fashion detachably associated. The "extension cord" so called, as I will hereinafter explain, is directly connected with the cap member. The base member 2 involves in its structure a body as 4. This body or core is of some insulating material such as porcelain or composition. It is generally made of cylindrical shape and receives around it the base shell 5 which after the usual fashion is made of metal so as to constitute a conductor. The base shell is threaded, thus adapting it to fit an incandescent lamp or other socket. This base shell 5 as common in this class of articles comparatively closely hugs or encircles the body or core 4 at one end, the base end as shown, is provided with a flange 6 overlying the base portion of the body or core 4. Said body or core has the longitudinal passages or openings 7 and 8 which as shown extend the complete length of the body. Said passages or openings 7 and 8 are adapted for the reception of suitable contact members 9 and 10. The contact 9 is provided at one end with an inwardly extending terminal which is united in the present case electrically with the contact shell 5. As shown said contact 9 is provided at its end with a lateral extension 11 which overlies the flange 6 of the shell. As shown the insulating body 4 is provided with two hollow rivets, eyelets or screws as 12 which are molded into the insulating body 4 and the projecting portions of which extend through openings or perforations in the flange 6 and lateral extension 11 respectively, the hollow rivets being headed over the lateral extension 11 to thus securely hold the contact 9 and the contact shell 5 in proper relation with the insulating body 4. This resilient contact 9 is as clear complemental to the contact 10, the two contacts, however, being insulated from each other as I will hereinafter set forth. Thus the means which hold the contact shell in place secure the contact 9 or analogous members in position or vice versa.

The contact 10 is provided near its outer end with the inwardly bent portion 13, this in turn being provided with the outward prolongation 14 terminating in the disk 15 which overlies the central cylindrical projection 16 of the body or core 4. This disk 15 fits solidly against the outer face of the central projection 16 and in the present case constitutes the central end contact of the plug. I will, of course, describe a way of holding the contact 10 in proper relation. When this contact 10 is properly secured, it is evident that the central end contact 15 is likewise retained in position as in the present case the two are in one. In view of this circumstance it is unnecessary as shown to centrally perforate the body or core 4 for the reception of a screw or the like which is generally in an attachment plug provided to secure the central end contact in place and also in some cases to carry current. As a matter of fact not only is this important, but I also attach some importance to the fact that I eliminate altogether in the base or body part of the plug at any rate, the use of screws. The free portions of the contacts 9 and 10 are engageable by complemental contacts associated with the cap member, and it is clear that when they are thus engaged and that when the attachment plug is fitted in a socket, the circuit will be in closed relation.

As shown the lateral extension 13 is provided with the ears 13′ fitted against the flat face of the body or core 4 and perforated as at 14′ to receive the hollow rivets 15′. These hollow rivets are embedded in the mass of the body 4 and their inner ends are expanded therein to hold them in place while if necessary said body is in a plastic or comparatively plastic condition. The rivets project from the flat upper face of the body and extend through the perforations 14′ and are headed over the ears 13′ to hold the contact 10 securely in position. This contact 10 as will be understood, is insulated from the shell 5.

The cap member 3 comprises the cap proper or body 17, which following the custom may be made of insulating material. To this cap body 17 are connected terminals 18 and 19 having provision for the electrical association therewith of the conductors or wires 20 and 21. The terminals 18 and 19 have contacts 22 and 23 respectively cooperative with the spring contacts 9 and 10. I do not rely upon the mere engagement of the contacts but provide means for interlocking them to guard against their accidental separation. In the present case both the contacts 22 and 23 are interlocked with the coöperating contacts 9 and 10. The resilient contacts 9 and 10 are furnished near their free ends with projections as 24 which as shown are formed by slitting or shearing the said contacts near their free ends and forcing the stock outwardly. These projections 24 are adapted to enter elongated slots 25 in the contacts 22 and 23 respectively.

It will be assumed that the wires 20 and 21 are connected electrically to the terminals 18 and 19 and that the cap member 3 is separated from the base member 2 as shown by dotted lines in Fig. 1 and that it is desired to connect the two parts as shown by full lines in said view. To accomplish this particular purpose the contacts 22 and 23 will be introduced into the passages 7 and 8 and moved therealong until the free ends of the contacts 22 and 23 strike the free ends of the contacts 9 and 10. Continuing the contacts 9 and 10 are bent outward until the projections 24 come opposite the slots 25 at which time the projections will be relatively sprung into the slots to thus obtain in an efficient manner the interlock to which I have already alluded. The cap member 3, therefore, before it can be separated from the base member will have to be pulled slightly. It holds as I have already practically observed in a manner sufficient to prevent accidental separation, but a slight pull will accomplish the detachment of the two members of the appliance.

The body has at its upper end the cavity or counterbore 30 intersected by the openings 7 and 8 into which it will be remembered the resilient contact portions 23 are introduced. The contacts 22 and 23 as they approach the body or core member 4 initially at their free ends enter this counterbore or cavity which thus insures proper passage of said contacts into the openings 7 and 8. The wall of the counterbore, or circular cavity or depression 30, intersects the outer ends of the passages 7 and 8, and the diameter of said counterbore is a little greater than the outside distance between the contacts 22 and 23. In the dark, therefore, it is not necessary for one to feel for the passages or slots 7 and 8 because the free ends of the contacts 22 and 23 can be introduced into the counterbore 30 and if the slots or passages 7 and 8 be not encountered, the parts 2 and 3 can be relatively turned so that the contacts 22 and 23 can be introduced into the proper passages 7 and 8 respectively. This is an exceedingly simple way to assure proper pole connection.

It will be clear from the foregoing description taken in connection with the annexed drawings, that an electrical attachment plug involving the invention comprises a body having passages and also having an end cavity a wall of which intersects the lateral surfaces of both passages, these passages generally being intended to receive contacts.

What I claim is:

1. An electrical attachment plug comprising an insulating body, a contact shell surrounding the body and provided with a flange bearing against an end of the body, contacts in the body provided with lateral extensions, one of the lateral extensions being fitted against said flange to thus put the two into electrical connection, the other lateral extension and its contact being insulated from said shell, and rivets molded into the body and extending through both lateral extensions and two of them also extending through the flange and headed over the lateral extensions.

2. An electrical attachment plug comprising an insulating body, a contact shell around the body and provided with a flange bearing against an end of the body, contacts in the body provided with lateral extensions, one of the lateral extensions being fitted against the exterior surface of said flange and the other being fitted against an end of the body to connect one contact electrically with the shell and to insulate the other therefrom, and two pairs of rivets molded into the body, one pair of rivets extending through the terminal portions of one extension and the other pair of rivets extending through the flange and also through the other extension at the terminals of the latter, the rivets being headed over the respective extensions.

3. An electrical attachment plug comprising an insulating body, a contact shell surrounding the body and provided with a flange bearing against an end of the body, contacts in the body provided with lateral extensions, one of the lateral extensions being fitted against said flange to thus put the two into electrical connection, the other lateral extension and its contact being insulated from said shell, and rivet-means molded into the body and extending through both lateral extensions, and a portion of said rivet means extending through the flange and headed over a lateral extension.

4. A body for an electrical attachment plug, of insulating material having longitudinally-extending contact-receiving passages which open into an end thereof, the body having contacts in the respective passages and finally having a counterbore in that end thereof into which said passages open, a side wall of the counterbore intersecting the lateral surfaces of the body passages.

5. A body for an electrical attachment plug, of insulating material having longitudinally-extending contact-receiving passages which open into an end thereof, the body having a cylindrical counterbore in that end thereof into which said passages open, the side wall of the counterbore intersecting the side surfaces of both passages between the inner and outer sides thereof, the inner sides of the end portions of the passages being practically flush with the bottom of the bore.

In testimony whereof I affix my signature.

JOHANN G. PETERSON.

Witnesses:

ELSIE M. RABENSTEIN,

HEATH SUTHERLAND.